(12) United States Patent
Penza

(10) Patent No.: US 6,510,868 B2
(45) Date of Patent: Jan. 28, 2003

(54) PROFILED PLATE VALVE

(75) Inventor: Neil C. Penza, Elverson, PA (US)

(73) Assignee: Coltec Industrial Products, Inc., Charlotte, NC (US)

( * ) Notice: Subject to any disclaimer, the term of this patent is extended or adjusted under 35 U.S.C. 154(b) by 0 days.

(21) Appl. No.: 09/759,779

(22) Filed: Jan. 11, 2001

(65) Prior Publication Data

US 2001/0029981 A1 Oct. 18, 2001

Related U.S. Application Data

(60) Provisional application No. 60/175,602, filed on Jan. 11, 2000.

(51) Int. Cl.$^7$ .............................................. F16K 15/08
(52) U.S. Cl. ............................ 137/516.23; 137/516.13; 137/516.21; 251/333
(58) Field of Search ..................... 137/516.13, 516.21, 137/516.23; 251/333

(56) References Cited

U.S. PATENT DOCUMENTS

| | | | |
|---|---|---|---|
| 3,123,095 A | | 3/1964 | Kohler |
| 3,310,066 A | | 3/1967 | Kehler |
| 3,327,731 A | | 6/1967 | Kehler |
| 3,536,094 A | | 10/1970 | Manley, Jr. |
| 3,703,912 A | | 11/1972 | Bauer et al. |
| 4,184,818 A | | 1/1980 | Petrovsky et al. |
| 4,368,755 A | * | 1/1983 | King ........................... 251/333 |
| 4,483,363 A | * | 11/1984 | Madoche et al. ...... 137/516.15 |
| 4,526,195 A | | 7/1985 | Humphrey et al. |
| 4,532,959 A | | 8/1985 | Hartshorn et al. |
| 4,705,068 A | | 11/1987 | Hartshorn |
| 4,723,572 A | * | 2/1988 | Tuymer ................. 137/516.21 |
| 4,852,608 A | | 8/1989 | Bennitt |
| 4,854,341 A | | 8/1989 | Bauer |
| 4,869,291 A | | 9/1989 | Hrabal |
| 4,889,156 A | | 12/1989 | Woollatt et al. |
| 4,924,906 A | | 5/1990 | Hrabal |
| 5,036,880 A | | 8/1991 | Safford et al. |
| 5,052,434 A | | 10/1991 | Bauer |
| 5,104,090 A | * | 4/1992 | Grizzle et al. ............... 251/333 |
| 5,311,902 A | * | 5/1994 | Overfield ................ 137/516.15 |
| 5,375,813 A | * | 12/1994 | Rozinsky ..................... 251/333 |

FOREIGN PATENT DOCUMENTS

| | | |
|---|---|---|
| FR | 1 058 907 | 3/1954 |
| GB | 768 340 | 2/1957 |

OTHER PUBLICATIONS

International Search Report dated May 14, 2001.
Hoerbiger, Ventile Valves, Product Brochure.

* cited by examiner

Primary Examiner—Michael Powell Buiz
Assistant Examiner—Ramesh Krishnamurthy
(74) Attorney, Agent, or Firm—Cummings & Lockwood LLC

(57) ABSTRACT

The subject application is directed to a compressor valve having a valve seat, a valve guard and a sealing plate with contoured sealing surfaces, the valve seat having defining inlet flow ports for admitting a controlled medium into the valve, the lower surface of the valve seat including at least one seating surface, the a valve guard having a recessed area and defining outlet flow ports for discharging a controlled medium from the valve, the sealing plate being positioned within a cavity between the valve guard and valve seat and moves relative to the lower surface of the valve seat between an open and closed position, the upper surface of the sealing plate defining at least one contoured sealing surface for engaging at least one seating surface of the valve seat along a continuous line of contact when the valve is in the closed position.

40 Claims, 11 Drawing Sheets

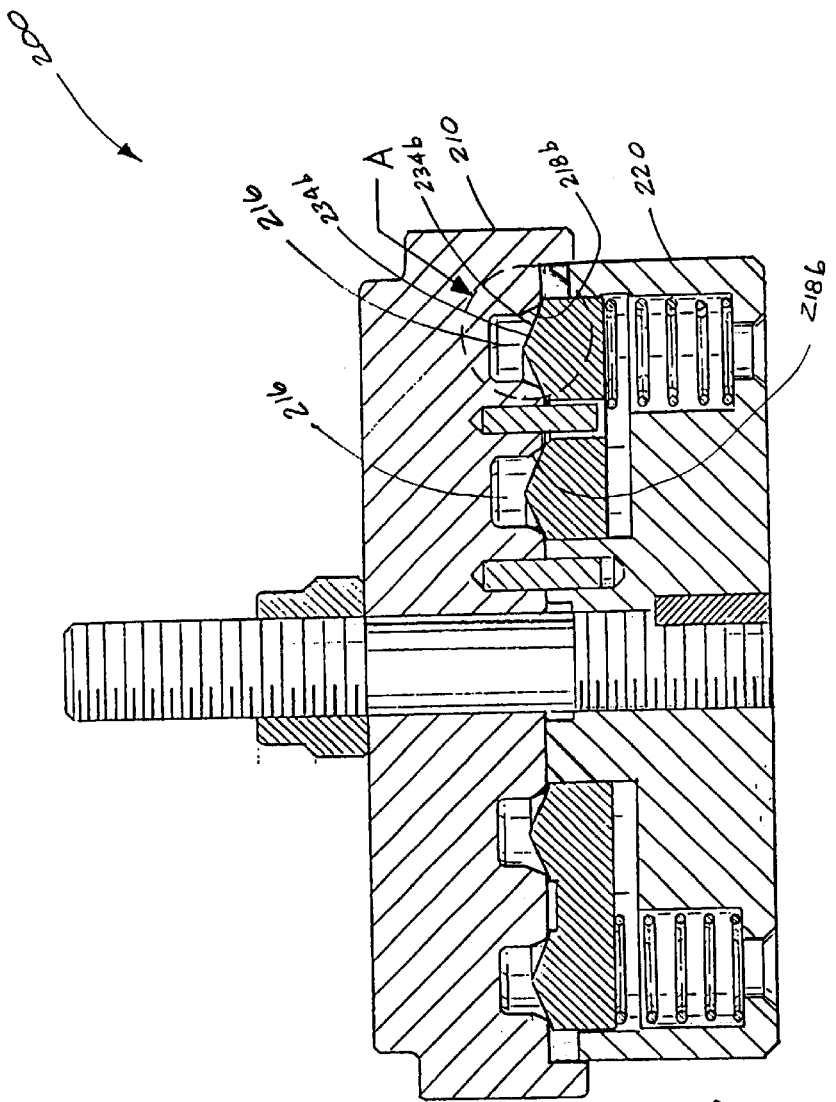
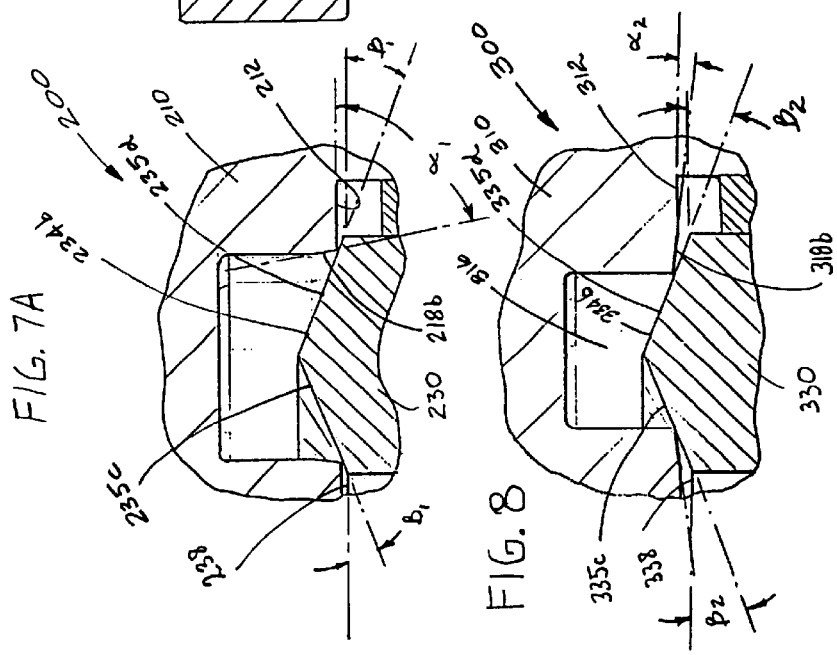

PROFILED PLATE VALVE

CROSS-REFERENCE TO RELATED APPLICATION

This application claims priority to U.S. Provisional Patent Application No. 60/175,602, filed Jan. 11, 2000, which is incorporated herein by reference.

BACKGROUND OF THE INVENTION

1. Field of the Invention

The subject invention relates to a plate valve for use with reciprocating compressors, and more particularly to, a valve having a sealing plate with contoured sealing surfaces.

2. Background of the Related Art

Reciprocating compressors are positive-displacement machines which generally include a piston, a piston rod, a cylinder, at least one suction valve and at least one discharge valve. In reciprocating compression, a medium, usually gas or air, is compressed by trapping the medium in an enclosed cylinder and then decreasing its volume by the action of a piston moving inside the cylinder. The medium is compressed to a pressure sufficient to overcome the spring tension holding a discharge valve closed, at which time the discharge valve opens and allows the compressed medium to leave the cylinder.

Because of the nature of the reciprocating piston, compression ceases at the limits of its stroke, the discharge valve again closes due to the action of the springs on the valve, the piston reverses direction, and a small amount of medium remaining in the cylinder expands, increasing in volume and decreasing in pressure. When the inlet pressure is higher than the pressure inside the cylinder and the spring tension holding the suction valve closed, the suction valve then opens, allowing the medium to flow into the cylinder. At the opposite limit of the piston stroke, the suction valve closes due to the springs acting on the valve, the piston again reverses direction, and the compression cycle begins anew.

Of the many components in a reciprocating compressor, none work harder nor serve a more important function than the suction and discharge valves. In fact, compressor efficiency is determined by the performance of the valves more than any other component. For optimum compressing efficiency to be achieved, these valves must be configured to provide a maximum flow area while at the same time, the medium flow through the valve must meet with a minimum resistance. In addition, it is critical that valve closure prevent leakage of gas or air in either direction.

Many compressors are run at peak loads for weeks or months at a time with no relief. In a typical 1000 rpm compressor, the valves which operate automatically with every stroke of the piston, open and close almost three million times a day. Therefore, in order to achieve optimum compressor efficiency, valve design must meet the above-mentioned objectives of efficient medium flow and control.

Generally, a compressor valve (discharge or suction) is composed exteriorly by two components, namely a valve seat and a valve guard. The valve seat provides inlet flow ports for the medium. The interior surface of the valve seat defines what is traditionally termed the seating surfaces. The valve guard defines outlet flow ports and is typically secured to the valve seat by bolts or a central stud and is spaced therefrom. Internally, the compressor valve is composed of a sealing plate or a series of rings and biasing elements such as helical springs. The sealing plate is disposed in the space between the valve seat and valve guard and is axially movable therein. The surfaces of the plate or rings which are located adjacent to the valve seat are termed sealing surfaces. These surfaces are designed to be engaged with corresponding seating surfaces of the valve seat. A biasing element is disposed between the valve guard and the sealing plate, urging the sealing plate sealing surfaces into a sealing engagement with the seating surface of the valve seat. In this biased position, the medium is prevented from flowing through the valve. As mentioned previously, when the operation of the compressor is such that sufficient pressure exists to overcome the force applied to the sealing plate by the biasing element, the valve will open allowing medium to flow into or out of the compressor cylinder.

The configuration of the sealing plate sealing surfaces and their engagement with the valve seat can have a dramatic impact on the flow of medium through the valve. In the compressor valves commonly in use today, there is an appreciable velocity head loss occasioned by problems in moving the fluid through the valve at high velocity. The problems are largely caused by energy losses resulting from extreme changes in flow direction, frictional interference and turbulence by the fluid as it passes through the compressor valve, around the sealing surfaces. These problems are especially critical in attempting to obtain optimum efficiency and capacity in high speed compressors undergoing 800 to 4000 strokes of the piston per minute.

In addition, configuration of the sealing plate sealing surfaces and their engagement with the valve seat can significantly impact the ability to prevent leakage of medium in either direction when the valve is in the closed position. Performance of the compressors, which by their nature have a very short stroke, requires valves which not only permit flow of the fluid or gases to and from the cylinder with a minimum of pressure loss and at a high velocity, but which will also seat rapidly and positively during the critical pressure reversals which take place at the beginning and end of the intake and discharge strokes.

Traditionally, a sealing plate for a compressor valve consisted of a circular plate that had opposed planar surfaces with flow ports extending between the opposed surfaces. For these valves the seating surfaces were planar and did not protrude into the flow ports of the valve seat, but merely covered the ports. U.S. Pat. No. 3,123,095 to Kohler discloses a plate valve with a sealing plate having planar seating surfaces. A disadvantage to this configuration, as well as others having planar sealing surfaces, is that flow through the valve tends to be turbulent resulting in increased pressure loss across the valve. The turbulence is caused by the rapid change in the direction of flow through the valve. In compressor valves, the flow ports of the sealing plate and the valve guard are aligned, but for obvious reasons these ports are offset from the inlet ports of the valve seat. As a result, the flow proceeds into the valve through the valve seat and must rapidly change direction in order to traverse to the ports in the sealing plate. This rapid change in direction results in the turbulent flow.

In an effort to improve the flow through the valve, sealing plates were furnished with profiled sealing surfaces which facilitate the flow through the valve by providing a smoother transition from the inlet flow ports of the valve seat to the flow ports of the sealing plate and valve guard. U.S. Pat. Nos. 3,536,094 to Manley discloses a prior art compressor valve having a sealing plate or rings with profiled sealing surfaces. The sealing surfaces in the Manley patent have a convex spherical cross-section which engages in concave spherical seating surfaces in order to interrupt the flow through the valve.

U.S. Pat. Nos. 4,924,906 and 5,052,434 to Harbal and Bauer receptively, also disclose valves with profiled sealing surfaces. Both of these patents disclose sealing surfaces that can be provided in a variety of cross-sections and engage in corresponding recesses in the valve seat. The Hrabal patent uses sealing rings which have a profiled cross-section and a support plate as the means for restricting and directing flow through the valve. The Bauer patent uses two piece rings of various cross-section to facilitate valve flow and closure.

The disclosures in the Manley, Harbal and Bauer patents attempt to provide a compressor valve that minimizes the velocity and pressure loss through the valve and increase the compressor efficiency by profiling the sealing surfaces. A disadvantage to these configurations is that the improvement in flow through the valve is achieved at the expense of valve seating performance. As noted, the optimum performance of the compressor requires valves which not only permit flow of the fluid or gases to and from the cylinder at a high velocity with a minimum amount of pressure loss, but which will also seat rapidly and reliably. The use of profiled sealing surfaces which are designed to mate with a corresponding profiled seating surface results in surface to surface contact (a surface contact condition). Having surfaces that mate reduces the contact pressure associated with the engagement of these surfaces and in turn reduces the reliability of the seal.

More specifically, contact pressure is a function of the contact force applied divided by the area of contact. The higher the contact pressure, the more reliable the seal. In compressor valves, the contact force is a result of the differential pressure across the valve and is primarily equal to the force exerted by the biasing element and has a constant magnitude. As a result, the only way to increase the contact pressure is to reduce the area of contact. It has been shown that a more reliable and rapid valve closure is achieved when the surfaces do not mate and the engagement between the sealing and seating surfaces occurs along a continuous line of contact.

There is a need, therefore, for a new valve which improves the flow of medium through the valve by providing a smoother transition from the inlet flow ports of the valve seat to the flow ports of the sealing plate and valve guard while at the same time improving the reliability of the seat engagement by increasing the engagement contact pressure.

SUMMARY OF THE INVENTION

The subject application is directed to a new and improved valve for use with reciprocating compressors, and more particularly to, a compressor valve having a sealing plate with contoured sealing surfaces, a valve seat, a valve guard and at least one biasing element for urging the sealing plate into engagement with the valve seat.

The valve seat has opposed upper and lower surfaces and defines inlet flow ports. The inlet flow ports extend between the upper and lower surfaces and provide a path for admitting a controlled medium into the valve. The lower surface of the valve seat includes at least one seating surface. The valve guard has a recessed area with opposed upper and lower surfaces and defines outlet flow ports. The outlet flow ports extend between the upper and lower surfaces of the valve guard and provide a path for discharging a controlled medium from the valve. The valve guard is secured to the valve seat and spaced therefrom to enclose the recessed area and define a cavity therebetween.

In accordance with the subject application, the sealing plate has opposed upper and lower surfaces and defines flow ports which extend between the upper and lower surfaces for facilitating flow of a controlled medium through the valve. The sealing plate is positioned within the cavity and moves relative to the lower surface of the valve seat between an open and closed position. In the open position the sealing plate is spaced from the lower surface of the valve seat so as to permit medium flow through the inlet flow ports of the valve seat and in the closed position the sealing plate is engaged with the valve seat so as to prevent medium flow through the valve. The upper surface of the sealing plate defines at least one contoured sealing surface for engaging the at least one contoured seating surface of the valve seat along a continuous line of contact when the valve is in the closed position.

Preferably, at least one biasing element is disposed between the valve guard and the sealing plate, for urging the sealing plate into the closed position. The biasing element is engaged within a corresponding recess in the valve guard. It is envisioned that at least one seating surface of the valve seat includes inclined surfaces oriented relative to the lower surface of the valve seat, wherein the angle of inclination of the inclined surfaces is about between 0 degrees and 90 degrees relative to the lower surface of the valve seat.

Preferably the contoured sealing surface of the sealing plate includes inclined surfaces oriented with respect to the upper surface of the sealing plate, wherein the angle of inclination of the inclined surfaces is about between 55 and about 20 degrees. It is also envisioned the angle of inclination of the inclined surfaces of the valve seat and the angle of inclination of the valve plate can differ from each other by about between 0 degrees and 10 degrees. Preferably, the angle of inclination of the inclined surfaces of the valve seat and the angle of inclination of the valve plate differ from each other by about 3 degrees. In a preferred embodiment of the subject application, the contoured sealing surface of the sealing plate includes curved surfaces for achieving line contact with a valve seat seating surface.

It is envisioned that the sealing plate of the subject invention is formed from a metallic material such as stainless steel, alloy steel, Inconel or titanium. Alternatively, the sealing plate may be formed from an non-metalic material (e.g., a thermoplastic, a thermoset, etc.) or a composite material (either reinforced or non-reinforced), or a material exhibiting substantially similar strength and flexural properties.

The subject invention is also directed to a compressor valve which includes a valve seat, valve guard, at least one biasing element and a sealing plate having first and second contoured sealing rings. The valve seat has opposed upper and lower surfaces and defines arcuate inlet flow ports for admitting a controlled medium. The inlet flow ports extend between the upper and lower surfaces, and the lower surface has first and second, seating surfaces. The valve further includes a valve guard which has a recessed area with opposed upper and lower surfaces. The arcuate outlet flow ports extend between the upper and lower surfaces and provide a path for discharging the medium from the valve. The valve guard is secured to the valve seat and spaced therefrom to enclose the recessed area and define a cavity therebetween.

The sealing plate has opposed upper and lower surfaces and defines arcuate flow ports. The arcuate flow ports extend between the upper and lower surfaces for facilitating flow of medium through the valve. The sealing plate is mounted for movement within the cavity and relative to the lower surface of the valve seat between an open position and closed position. As noted above, the upper surface of the sealing plate defines first and second contoured sealing rings for engaging the first and second seating surfaces of the valve seat along a continuous line of contact when the valve is in the closed position.

The subject invention is also directed to a sealing plate for a compressor valve which includes a valve seat defining inlet flow ports and a valve guard defining outlet flow ports. The sealing plate includes a body having opposed upper and lower surfaces and defines flow ports extending between the upper and lower surfaces for facilitating flow of a controlled medium through the valve. The upper surface of the sealing plate defines at least one contoured sealing surface which engages at least one seating surface of a valve seat when the valve is biased into a closed position thereby, preventing the flow of a controlled medium through the valve. The contoured sealing surfaces have a cross-sectional configuration that is adapted and configured to achieve continuous line contact with the valve seat seating surfaces when the valve is in the closed position.

Those skilled in the art will readily appreciate that the subject invention improves the flow of medium through the valve by providing a smoother transition from the inlet flow ports of the valve seat to the flow ports of the sealing plate and valve guard and improves the reliability of the seat engagement by increasing the engagement contact pressure.

These and other unique features of the valve disclosed herein will become more readily apparent from the following description, the accompanying drawings and the appended claims.

BRIEF DESCRIPTION OF THE DRAWINGS

So that those having ordinary skill in the art to which the present application appertains will more readily understand how to make and use the same, reference may be had to the drawings wherein:

FIG. 7 is a cross-sectional view of a valve having a sealing plate with contoured sealing surfaces, the sealing plate being operatively positioned between a valve guard and valve seat which has a contoured lower surface seating surface, the sealing plate being biased to a closed position by helical springs and thereby engaged with the contoured seating surface of the valve seat FIG. 7A is an enlarged cross-sectional view of the contoured sealing plate sealing surface engaged with a contoured seating surface of the valve seat, wherein the angle of inclination of the inclined surfaces of the valve seat and the sealing plate differ from each other creating continuous line contact at the point of engagement, the inclination $\alpha_1$ of the valve seat seating surfaces being greater than the inclination $\beta_1$ of the sealing plate inclined surfaces;

FIG. 8 is an enlarged cross-sectional view of a contoured sealing plate sealing surface engaged with the seating surface of a valve seat, wherein the angle of inclination of the inclined surfaces of the valve seat and the sealing plate, $\alpha_2$ and $\beta_2$, respectively, differ from each other creating continuous line contact at the point of engagement, the inclination $\alpha_2$ of the valve seat seating surfaces being less than the inclination $\beta_2$ of the sealing plate inclined surfaces;

These and other features of the subject invention will become more readily apparent to those having ordinary skill in the art form the following detailed description of the preferred embodiments.

DETAILED DESCRIPTION OF PREFERRED EMBODIMENTS

The present invention overcomes several of the problems associated with prior art plate valves used in reciprocating compressors. The advantages, and other features of the valve disclosed herein, will become more readily apparent to those having ordinary skill in the art from the following detailed description of certain preferred embodiments taken in conjunction with the drawings which set forth representative embodiments of the present invention.

Figure 1:
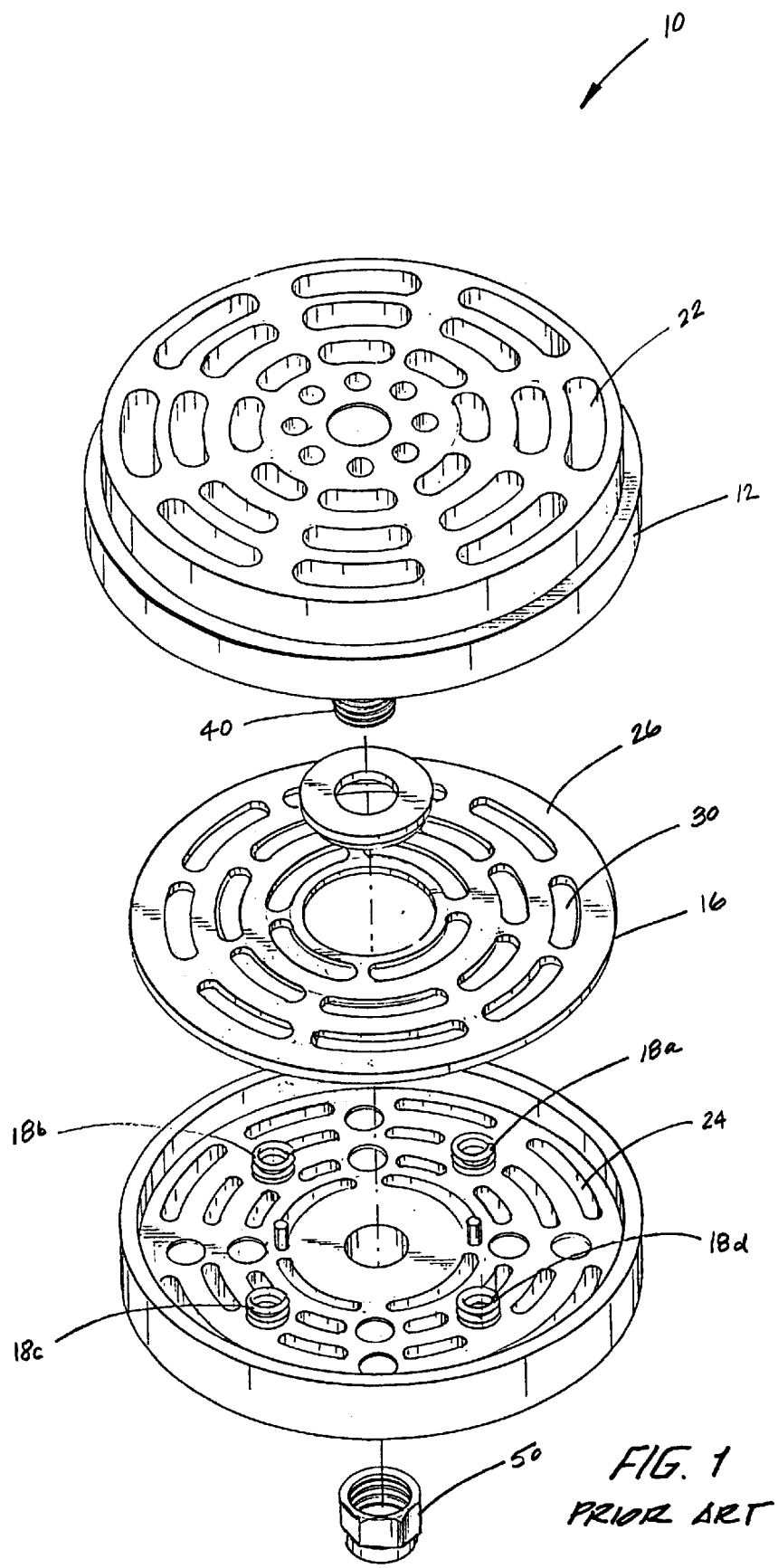
FIG. 1 is a partially exploded perspective view of a prior art plate valve which includes a valve seat, a valve guard, a sealing plate and helical springs, the sealing plate having planar upper and lower surfaces.

Referring now to the drawings wherein like reference numerals identify similar structural elements of the subject invention, there is illustrated in FIG. 1 a prior art plate valve for use in reciprocating compressors designated generally by reference numeral 10. Plate valve 10 primarily includes a valve seat 12 having a circular configuration, a valve guard 14 having a circular condition, planar sealing plate 16 and helical biasing elements 18a–18d. Valve seat 12 and valve guard 14 each define a plurality of arcuate inlet and outlet flow ports, designated as reference numerals 22 and 24, respectively. In the assembled configuration, stud body 40 and nut 50 secure valve seat 12 to valve guard 14, wherein sealing plate 16 is disposed in a cavity defined between valve seat 12 and valve guard 14, and is axially movable therein.

In operation, biasing elements 18a–18d, preferably defined by a plurality of helical springs, urge the upper surface 26 of sealing plate 16 against valve seat 12. In such a position, sealing plate 16 prevents a medium from flowing through the valve 10 by blocking or covering inlet flow ports 22. As shown in FIG. 1, the upper surface 26 of the prior art sealing plate 16 is planar and does not project into flow ports 22 of the valve seat 12.

When the pressure on the exterior valve 10 due to the operation of the compressor is sufficient to overcome the force exerted by biasing elements 18a–18d, sealing plate 16 moves axially within the cavity between the valve seat 12 and valve guard 14 until sealing plate 16 contacts valve guard 14. At such a time the flow of medium proceeds through inlet ports 22, then through flow ports 30 disposed in sealing plate 16, and then through outlet flow ports 24 in valve guard 14. The flow ports in the sealing plate and valve guard, 30 and 24 respectively are aligned, but they are offset from the inlet flow ports 22 in valve seat 12. Since inlet flow ports 22 are offset from aligned flow ports 30 and 24, the flow of the medium through valve 10 is not linear and the transition from valve seat 12 to sealing plate 16 requires a change in flow direction. This causes turbulence which results in a pressure drop across the valve 10. This configuration is similar to the valve assembly shown in U.S. Pat. No. 4,852,608 to Bennitt.

Figure 2:
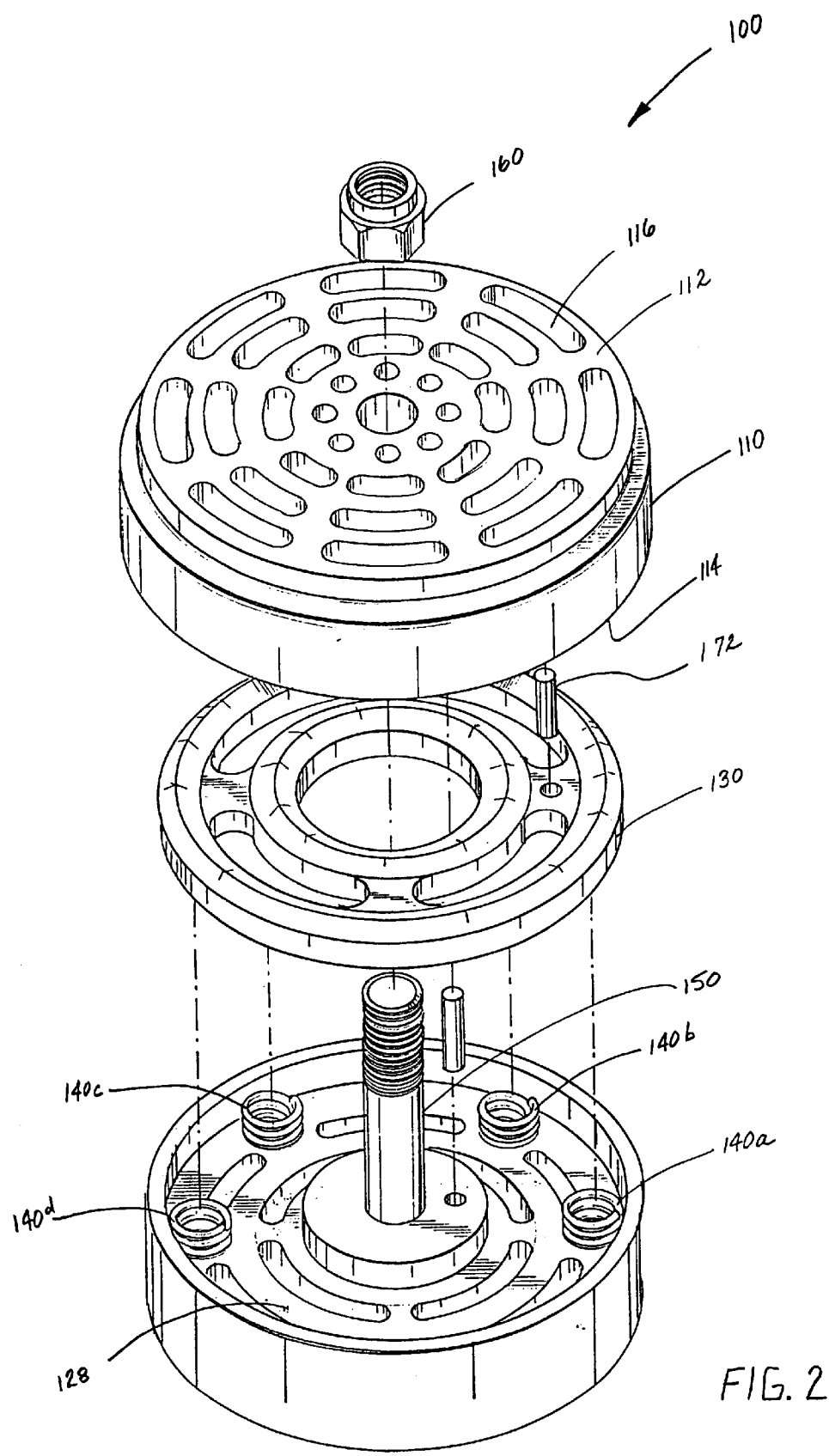
FIG. 2 is a partially exploded perspective view of a plate valve which includes a valve seat, a valve guard, a sealing plate, an elongated stud which provides a central axis for the valve, and helical springs.

Referring to FIG. 2, there is illustrated a valve constructed in accordance with a preferred embodiment of the subject invention and designated generally by reference numeral 100. Valve 100 primarily includes a valve seat 110 having a circular configuration, a valve guard 120 having a circular configuration, and a contoured sealing plate 130. A central axis extends through the center of valve 100. Valve seat 110 and valve guard 120 define arcuate inlet and outlet flow ports, designated by reference numerals 116 and 126 respectively. Although the flow ports are shown as being arcuate, it is envisioned and within the scope of the subject disclosure that the ports can be linear, rectangular or any shape suitable to facilitate the flow of medium through a valve.

In the assembled condition, stud body 150 and nut 160 secure valve seat 110 to valve guard 120 along the central axis of the valve. Sealing plate 130 is disposed in cavity 128 defined between valve seat 110 and valve guard 120 and is axially movable therein between the open and closed positions. In the closed position, the sealing plate 130 is engaged with valve seat 110 to prevent the flow of medium through valve 100. In the open position, the sealing plate 130 is spaced from valve seat 110 and medium can flow through the valve 100. As noted, it is preferable that stud body 40 extends through the central axis of valve 100. However, those skilled in the art will recognize that other valve configurations exist in which a central stud is not used for securing the valve seat to the valve guard and that this feature is not a limitation to the disclosure provided in the present application.

Figure 3:
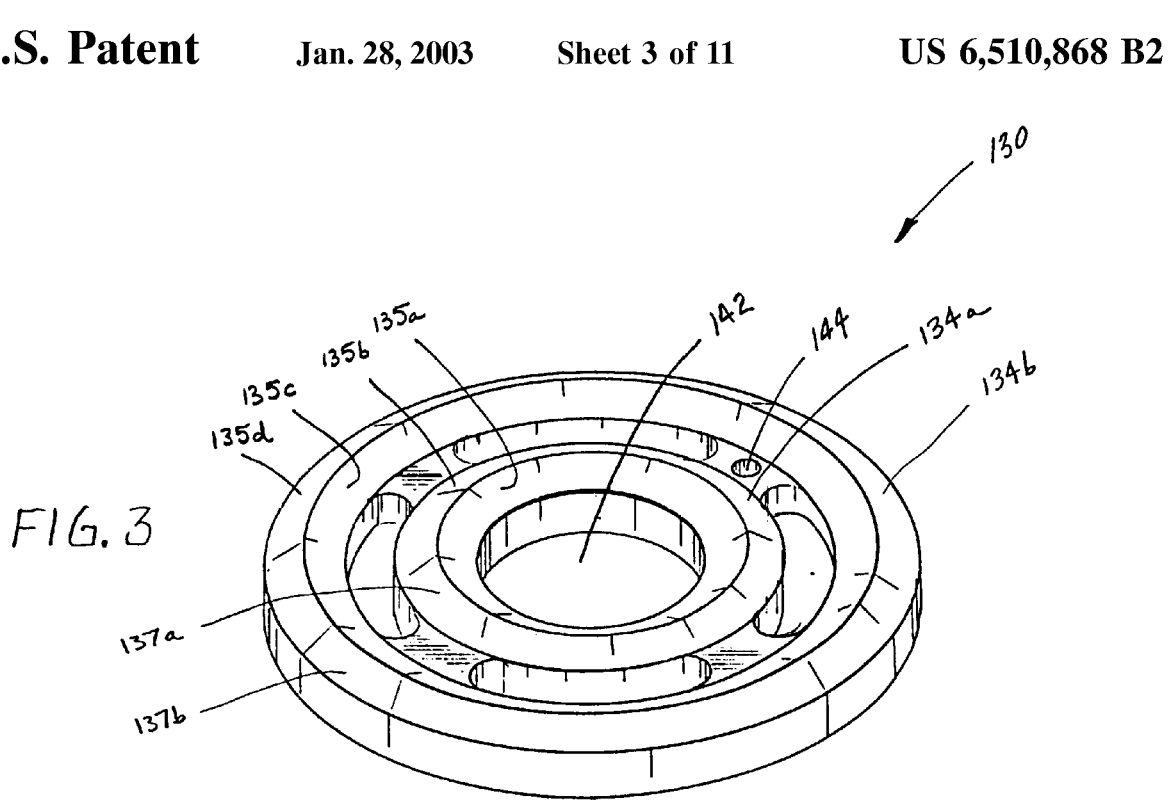
FIG. 3 is a perspective view of a sealing plate having arcuate flow ports and contoured sealing surfaces which include inclined surfaces with respect to the upper surface of the sealing plate.
Figure 4:
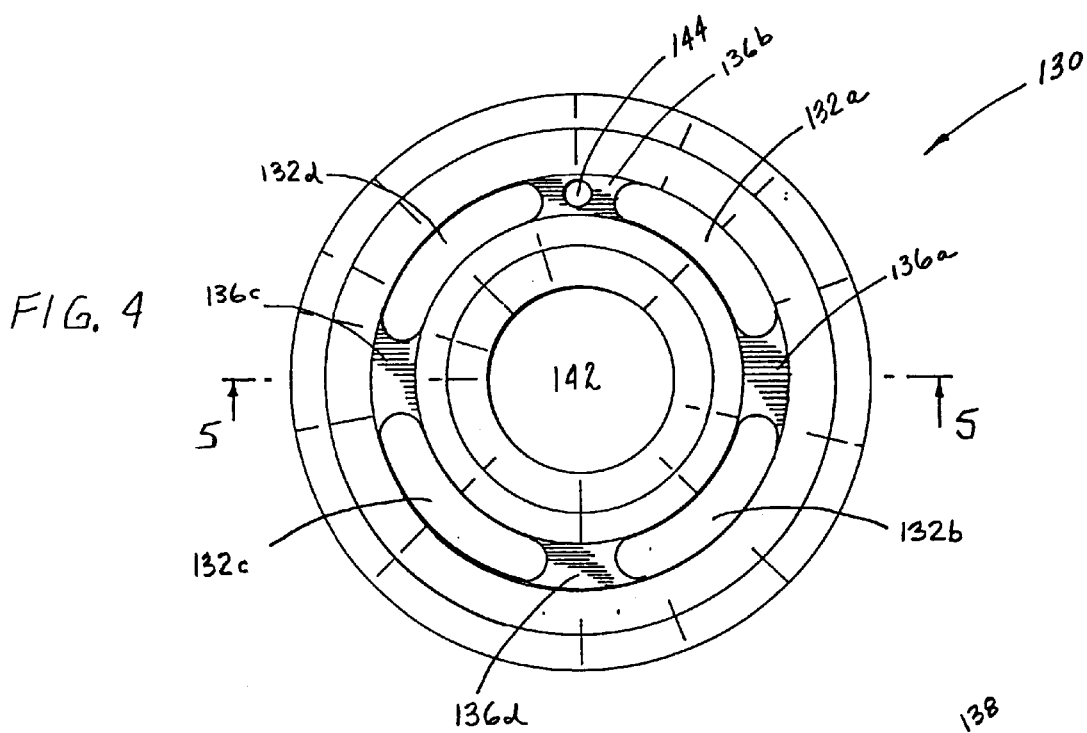
FIG. 4 is a top plan view of the sealing plate shown in FIG. 3 in which four arcuate flow ports and four radial webs separate concentric contoured sealing surfaces.
Figure 5:
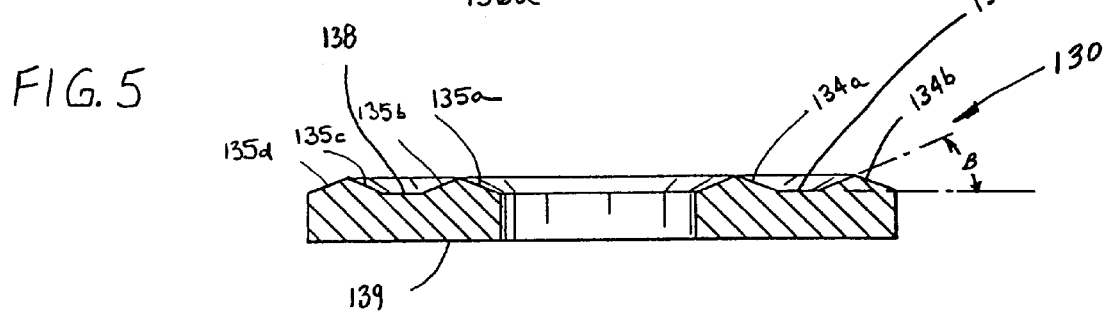
FIG. 5 is a cross-sectional view taken along line 5—5 of FIG. 4 in which the sealing surfaces of the sealing plate are contoured having obtuse triangular cross-section.

Referring to FIGS. 3 through 5, sealing plate 130 includes radially inner and radially outer concentric rings 137a and 137b connected to one another by circumferentially spaced apart web portions, 136a–136d. It is envisioned that additional ring portions may be provided depending on the intended use and specific environment of the valve. The sealing plate 130 has upper and lower surfaces 138 and 139, respectively, and defines four flow ports 132a–132d which extend between upper and lower surfaces 138 and 139. As shown in FIG. 4, flow ports 132a–132d are arcuate and extend for an arc angle of about 70 degrees. However, as noted above, it is envisioned and within the scope of the subject disclosure that the ports can be linear, circular, rectangular or any shape suitable to facilitate the flow of medium through a valve. Also, the quantity of flow ports can vary depending upon the size and configuration of the valve. Of course, if the quantity, size or shape of the flow ports in the sealing plate change, the quantity size and shape of the inlet and outlet flow ports associated with valve seat and valve guard must be adjusted accordingly. Sealing plate 130 also includes a central aperture 142 for facilitating central alignment of sealing plate 130 and an alignment hole 144, though which alignment pin 172 (see FIG. 2) is engaged to ensure proper rotational orientation of sealing plate 130 with respect to valve seat 110 and valve guard 120.

Preferably, sealing plate 130 is formed from metals such as an alloy steel or stainless steel. Alloy steels can typically be used in general service applications and stainless steels or special alloys can be used in more corrosive applications. Alternatively, sealing plate 130 can be formed from a non-metallic material or composite material such as Asbestos-Bakelite, Glass-Melamine or a fiber reinforced polymer or thermoplastic. These types of materials are lightweight thereby reducing inertial forces and minimizing the forces exerted on the valve seat. They are also able to resist a wide range of corrosive chemicals.

With continuing reference to FIGS. 3 through 5, the upper surface 138 of sealing plate 130 includes first and second contoured sealing surfaces designated as reference numerals 134a and 134b. In this configuration, first and second contoured sealing surfaces 134a and 134b include inclined planes 135a–135d which form triangular cross-sections taken along line 5-5 of FIG. 4. The angle of inclination "β" of inclined planes 135a–135d with respect to upper surface 138 is about 30 degrees. In alternate embodiments, the angle β can be in the range of between about 55 and about 20 degrees with respect to the upper surface 138 of sealing plate 130.

Figure 6A:
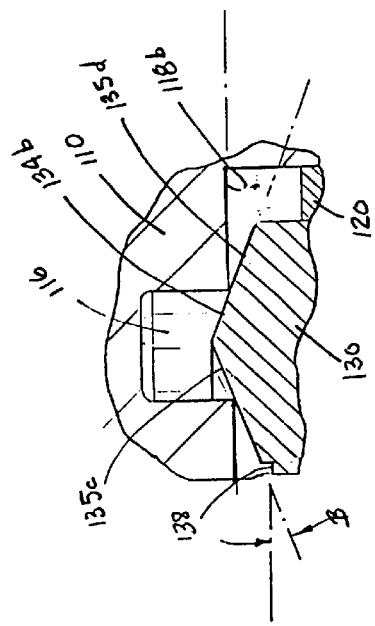
FIG. 6A is an enlarged cross-sectional view of a sealing plate having a contoured sealing surface in continuous linear contact with a valve seat, the valve seat having a seating surface which is substantially planar.
Figure 6:
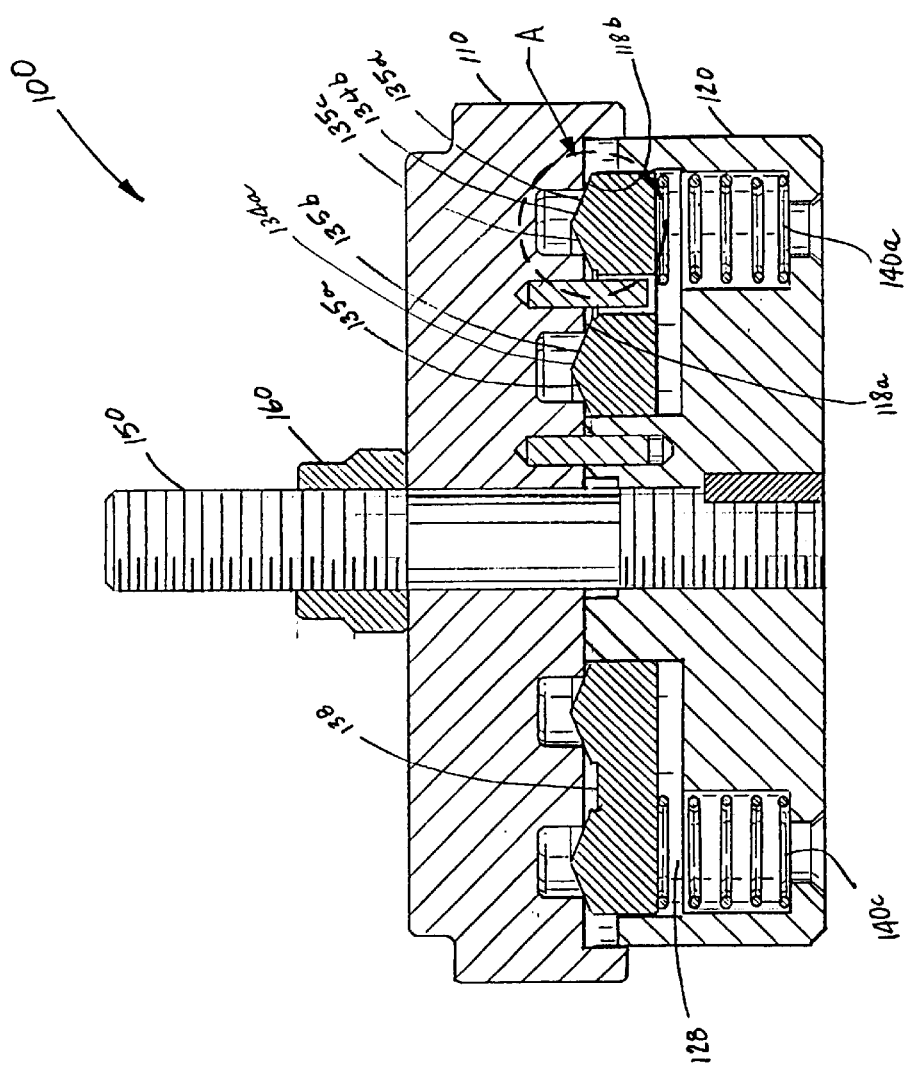
FIG. 6 is a cross-sectional view of a valve having a sealing plate with contoured sealing surfaces, the sealing plate being operatively positioned between a valve guard and a valve seat which has a substantially planar lower surface, the sealing plate being biased to a closed position by helical springs and thereby engaged with the planar seating surface of the valve seat.

Referring now to FIGS. 6 and 6A, sealing plate 130 is disposed in the cavity 128 defined between valve seat 110 and valve guard 120 and is biased into the closed position by four biasing elements 140a–140d (see FIG. 2). As noted previously, seat plate 130 has first and second contoured sealing surface 134a and 134b that have a triangular configuration when viewed in cross-section. Alternate embodiments can have one or more sealing surfaces, the quantity being determined by the number of inlet flow ports and being limited by the size of the valve and the desired flow area.

Similar to prior art valves, in operation, biasing elements 140a–140d, which include a plurality of helical springs, but can be a flexible plate member or other biasing means, are disposed between the valve guard 120 and the contoured sealing plate 130. The biasing elements 140a–140d urge the contoured sealing surfaces 134a and 134b of sealing plate 130 into sealing engagement with the seating surfaces 118a and 118b of valve seat 110. When in sealing engagement, sealing surfaces 134a and 134b protrude into flow ports 116 and the flow of medium through valve 100 is prevented. When the pressure on the valve seat 110 side of valve 100 is sufficient to over come the force imparted on sealing plate 130 by the biasing elements 140a–140d, valve 100 opens, and medium flows into ports 116 in valve seat 110. The medium then flows passed the contoured sealing surfaces 134a and 134b and into ports 132a–132d (See FIG. 4). The contoured sealing surfaces 134a and 134b of sealing plate 130 provide a smooth transition for the flow of medium from the valve seat 110 to the sealing plate 130 flow ports 116. This is a marked improvement over prior art plate valves which have a planar sealing plate FIG. 6A illustrates an enlarged view of the area designated by localized view "A" in FIG. 6 of a valve having a valve seat 110 with planar seating surfaces 118a and 118b. As shown, contoured sealing plate 130 is engaged with valve seat 110 and it has a contoured sealing surface 134b which includes inclined surfaces 135c and 135d. Inclined surfaces 135c and 135d are inclined with respect to the upper surface 138 of sealing plate 130. As a result of this inclination angle β, the engagement of sealing plate 130 with valve seat 110 occurs along a continuous line of contact when the valve is in a closed position. In doing so, the engagement contact pressure is increased, improving the reliability of valve closure. Preferably, surfaces 135c and 135d are inclined at about 30 degrees from upper surface 138. However, the angle of inclination β can be between 55 degrees and 20 degrees relative to the upper surface 138 of the sealing plate 130.

Referring now to FIG. 7 there is illustrated a compressor valve designated generally by reference numeral 200. Localized view "A" illustrates the area of valve 200 wherein the contoured sealing surface 234b of sealing plate 230 sealingly engages valve seat 210 so as to achieve continuous line contact therebetween. This prevents the flow of medium through inlet flow ports 216. Unlike valve 100, valve seat 210 has contoured sealing surfaces 218a and 218b which serve to facilitate the flow through the valve 200 by providing a smoother transition from the inlet flow ports 116 of the valve seat 110 to flow ports 132a–132d of the sealing plate 130 and valve guard 120.

Referring to FIG. 7A, sealing plate 230 engages valve seat 210. Sealing plate 230 has a contoured sealing surface 234b which includes inclined surfaces 235c and 235d. Surfaces 235c and 235d are inclined with respect to upper surface 238 at an angle of inclination of $\beta_1$ degrees. Seating surface 218b is inclined with respect to the lower surface 212 of valve seat 210 at an angle of inclination of $\alpha_1$. In this embodiment, the angle of inclination of the inclined surfaces of the valve seat 210 and the sealing plate 230, $\alpha_1$ and $\beta_1$ respectively, differ from each other whereby the inclination $\beta_1$ is less than the inclination $\alpha_1$. Consequently, the engagement of sealing plate 230 with valve seat 210 occurs along a continuous line of contact when the valve 200 is in a closed position, thereby increasing the engagement contact pressure and improving the reliability of valve closure.

Referring to FIG. 8, sealing plate 330 is engaged with valve seat 310. Sealing plate 330 has a multi-ring body with contoured sealing surface 334b which includes inclined planes 335c and 335d. Surface 335c and 335d are inclined with respect to upper surface 338 of sealing plate 330 by $\beta_2$ degrees. The angle of inclination of seating surface 318b with respect to the lower surface 312 of the valve seat 310 is $\alpha_2$ degrees. In this embodiment, the angle of inclination of the inclined surfaces, $\alpha_2$ and $\beta_2$, differ from each other, such that the inclination $\beta_2$ of the sealing plate 330 inclined surfaces 335c and 335d is greater than the inclination $\alpha_2$ of the valve seat seating surface 318b. As a result of the difference in $\alpha_2$ and $\beta_2$, the engagement of sealing plate 330 with valve seat 310 occurs along a continuous line of contact when the valve 300 is in a closed position, again resulting in increased contact pressure and a more reliable valve closure.

Figure 9:
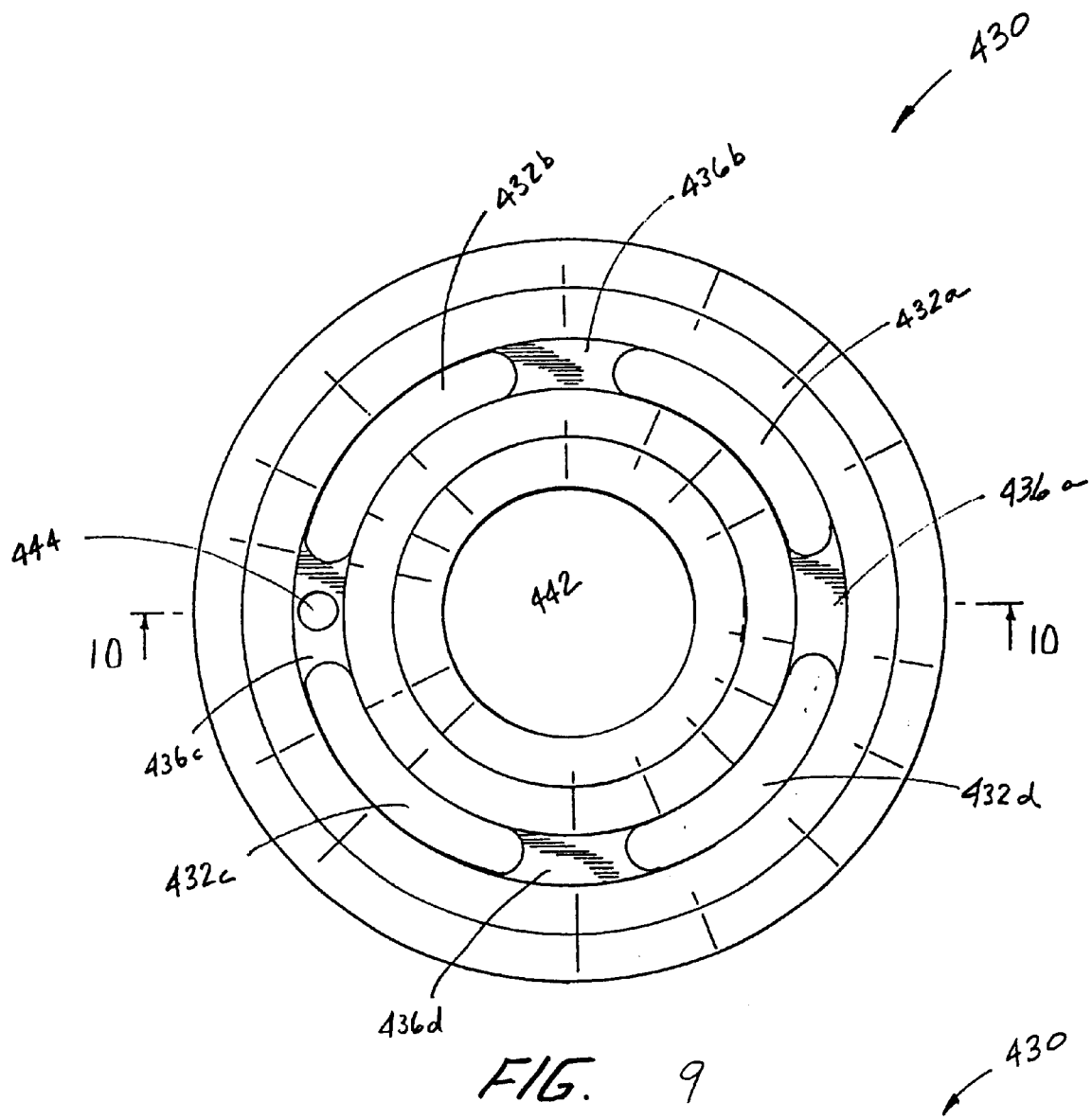
FIG. 9 is a top plan view of a sealing plate in which four arcuate flow ports and four radial webs separate first and second concentric sealing surfaces.
Figure 10:
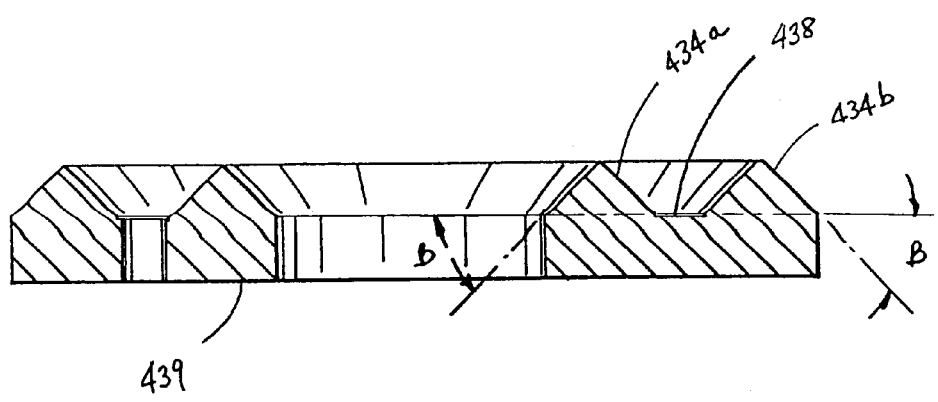
FIG. 10 is a cross-sectional view taken along line 10—10 of FIG. 9 illustrating contoured sealing surfaces which have an equilateral triangular cross-section.

Referring now to FIGS. 9 and 10, which illustrate a sealing plate 430 that is substantially similar in structure and function to the sealing plate 130 shown in FIGS. 3 through 5, except that the contoured sealing surfaces 434a and 434b thereof have an equilateral triangular cross-sections when viewed along line 10–10 of FIG. 9. As a result of the inclination β of sealing surfaces 434a and 434b, the engagement of sealing plate 430 with a valve seat having a planar seating surface or seating surface that is inclined at an angle which is notably different than β, will occur over a continuous line of contact.

Figure 11:
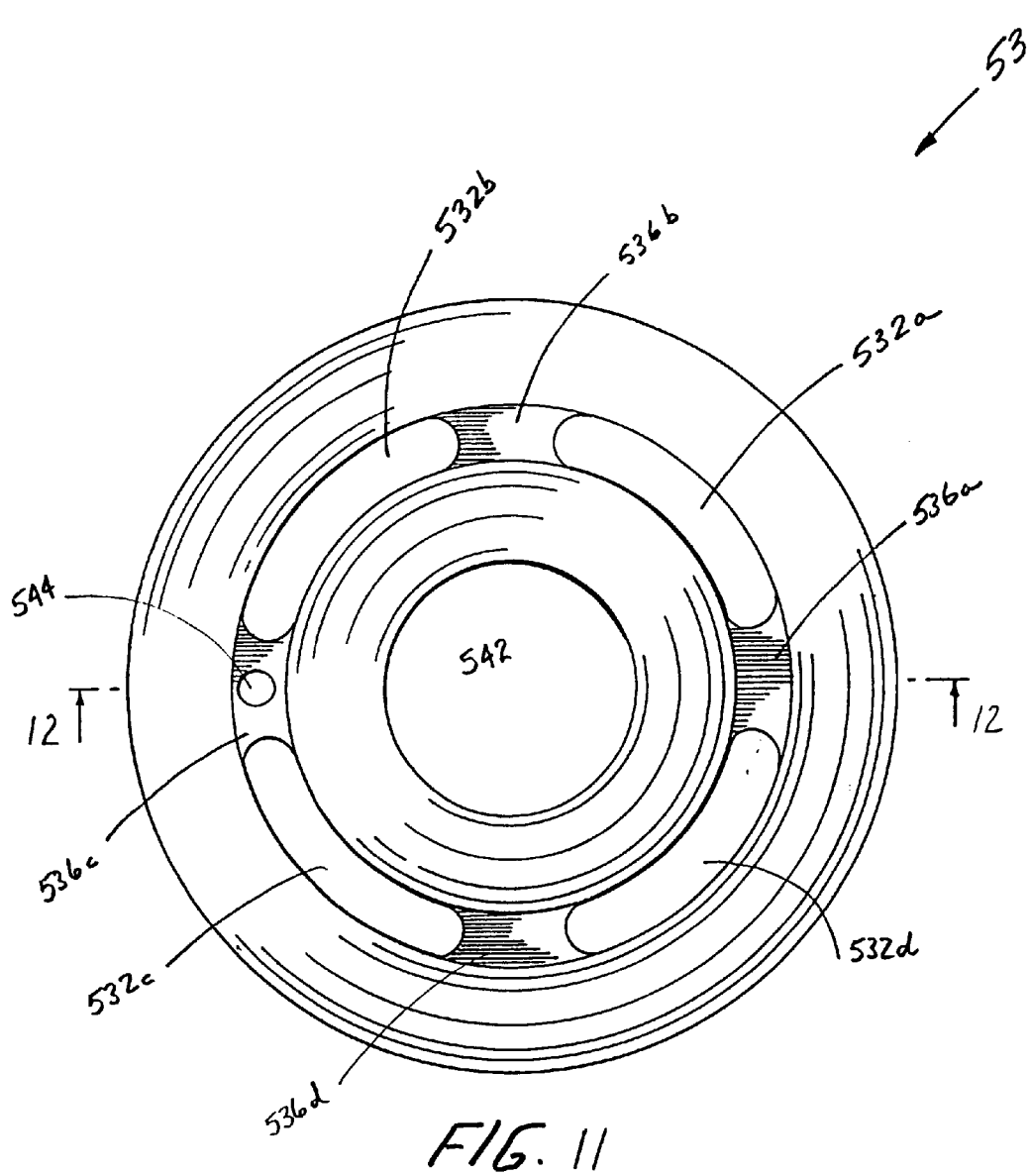
FIG. 11 is a top plan view of a sealing plate in which four arcuate flow ports and four radial webs separate concentric sealing surfaces, the sealing plate further including a hole for insertion of an alignment pin which maintains the sealing plate in the desired orientation with respect to the valve seat and valve guard.
Figure 12:
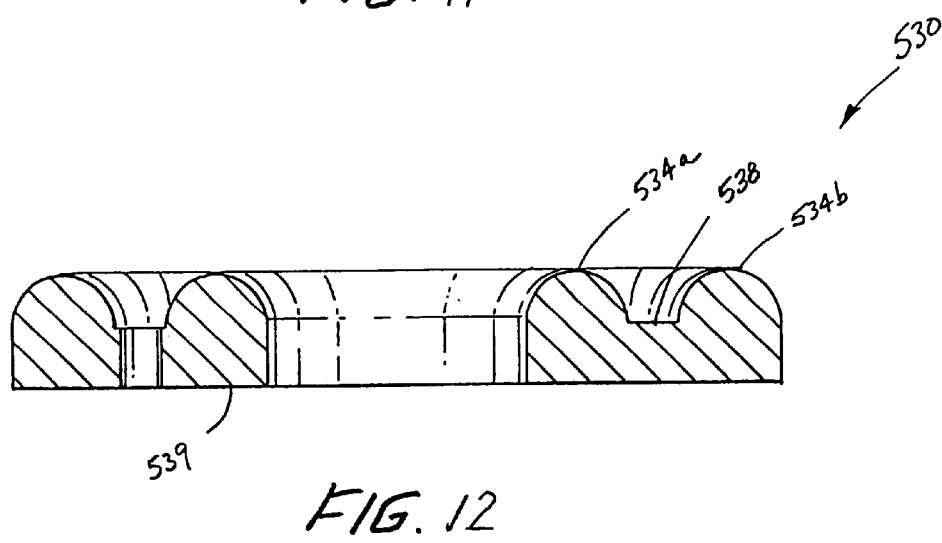
FIG. 12 is a cross-sectional view of the sealing plate taken along line 12—12 of FIG. 11 in which the contoured sealing surfaces have an curved convex cross-section.

Referring to FIGS. 11 and 12, sealing plate 530 has contoured sealing surfaces 534a and 534b that have a curved convex cross-section when viewed along line 12—12 of FIG. 11. As a result of the curvature of sealing surfaces 534a and 534b, the engagement of sealing plate 530 with a valve seat having a planar seating surface or seating surface that has inclined planes, will occur over a continuous line of contact. It should be appreciated that the line of contact occurs along a tangent to the curve which forms the contoured sealing surfaces 534a and 534b.

Figure 13:
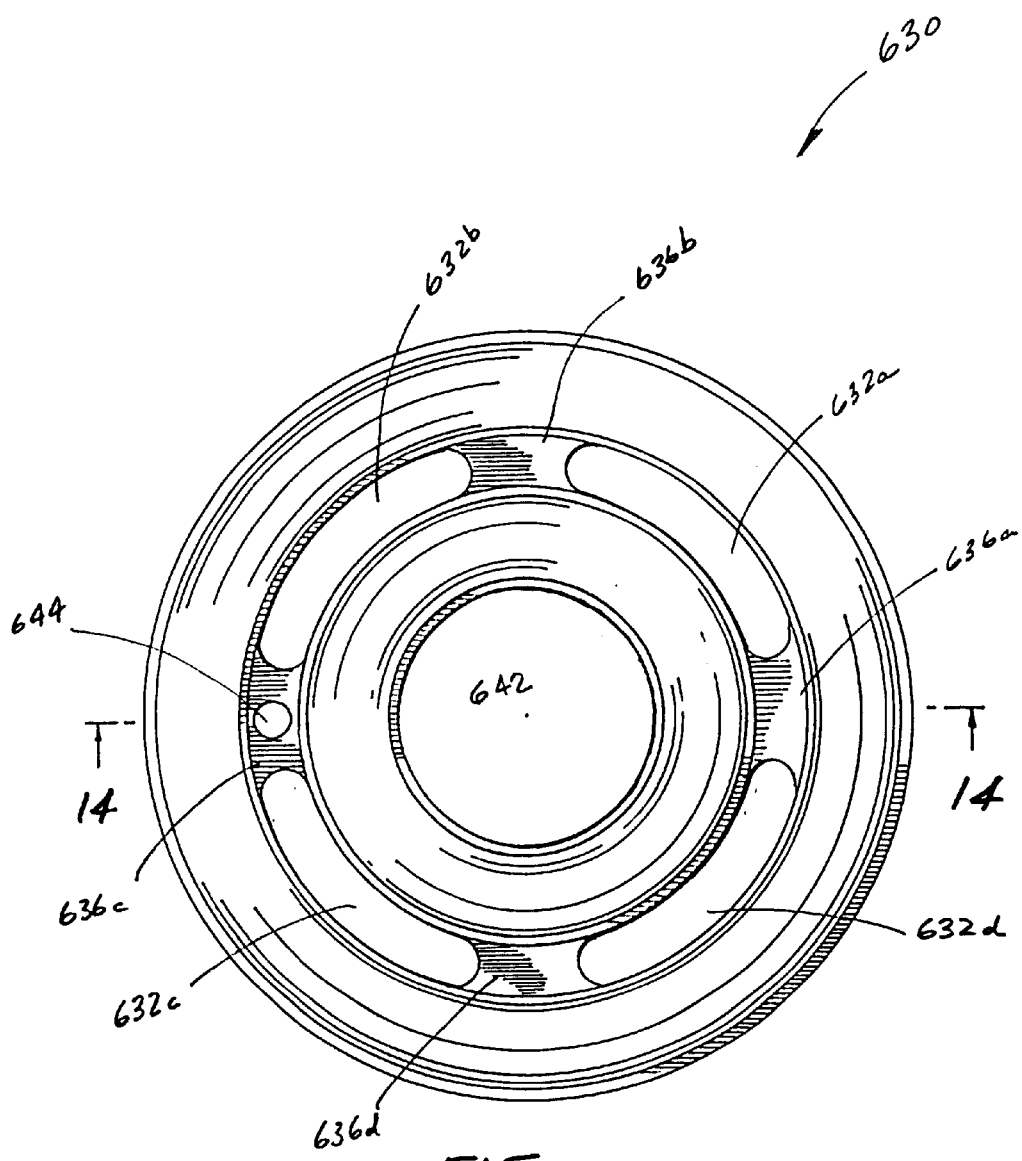
FIG. 13 is a top plan view of a sealing plate in which four arcuate flow ports and four radial webs separate concentric sealing surfaces, the sealing plate further including a central aperture which facilitates centering of the sealing plate within the valve.
Figure 14:
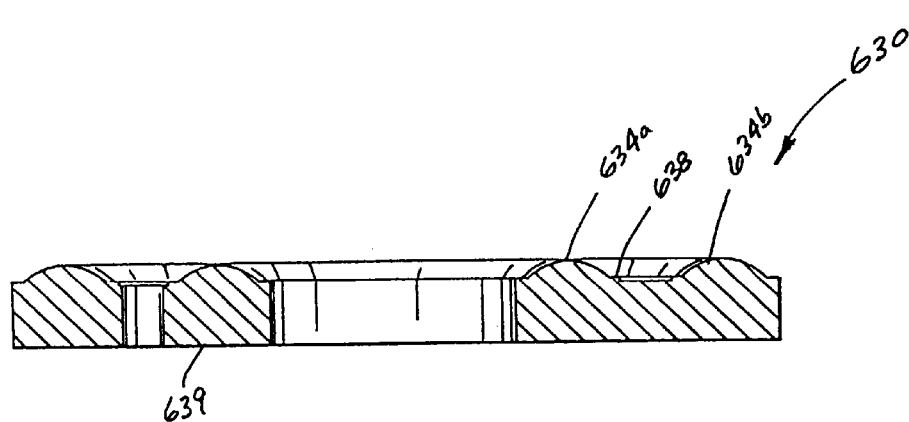
FIG. 14 is a cross-sectional view taken along line 14—14 of FIG. 13 illustrating contoured sealing surfaces which have convex cross-section.

Referring to FIGS. 13 and 14, there is illustrated a sealing plate 630 which is substantially similar in structure and function to sealing plate 530, except that the contoured sealing surfaces 634a and 634b have a curved convex cross-section when viewed along line 14—14 of FIG. 13 which is much smaller in height than surfaces 544a and 534b of sealing plate 530. As a result of the curvature of sealing surfaces 634a and 634b, the engagement of sealing plate 630 with a valve seat having a planar seating surface or seating surface that includes inclined planes, occurs over a continuous line of contact. In particular, the line of contact occurs along a tangent to the curve which forms the contoured sealing surfaces 634a and 634b thereby improving the reliability of the valve closure by increasing the engagement contact pressure.

Figure 15:
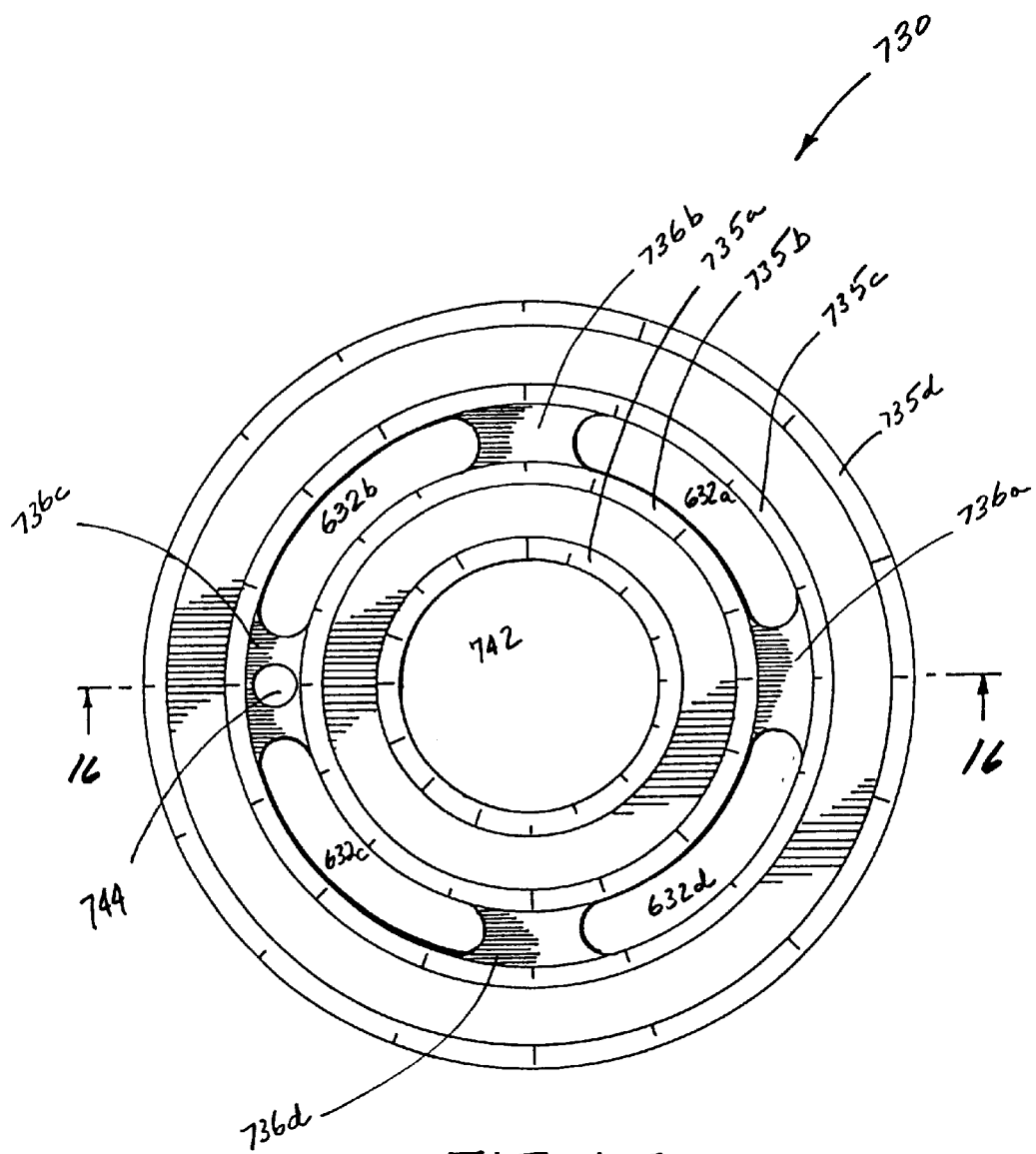
FIG. 15 is a top plan view of a sealing plate in which four arcuate flow ports and four radial webs separate concentric sealing surfaces, the sealing plate further including a hole for insertion of an alignment pin which maintains the sealing plate in the desired orientation with respect to the valve seat and valve guard.
Figure 16:
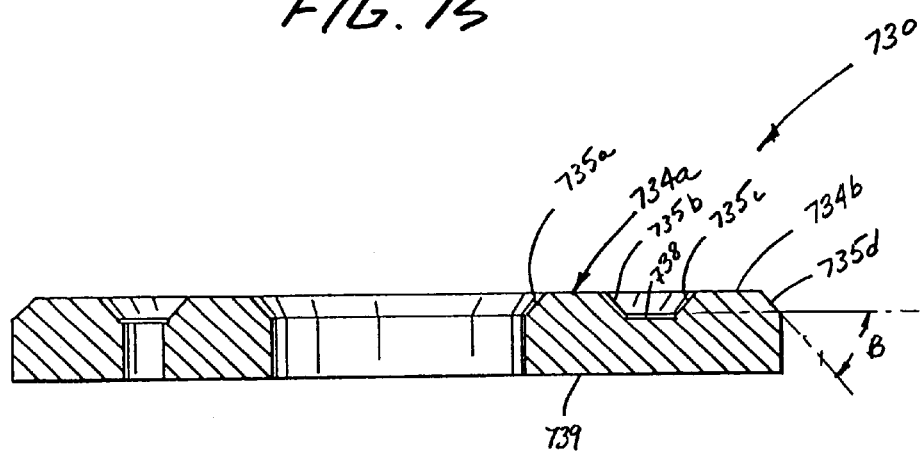
FIG. 16 is a cross-sectional view taken along line 16—16 of FIG. 15 illustrating a sealing plate with contoured sealing surfaces which have a truncated triangular cross-section.

Referring to FIGS. 15 and 16, sealing plate 730 has contoured sealing surfaces 734a and 734b that have a truncated triangular cross-section when viewed along line 16—16 of FIG. 15. As a result of the inclination β of inclined surfaces 735a—735d of sealing surfaces 734a and 734b, the engagement of sealing plate 730 with a valve seat having a planar seating surface or seating surface that is inclined at an angle which is notably different than β, occurs over a continuous line of contact.

Figure 17:
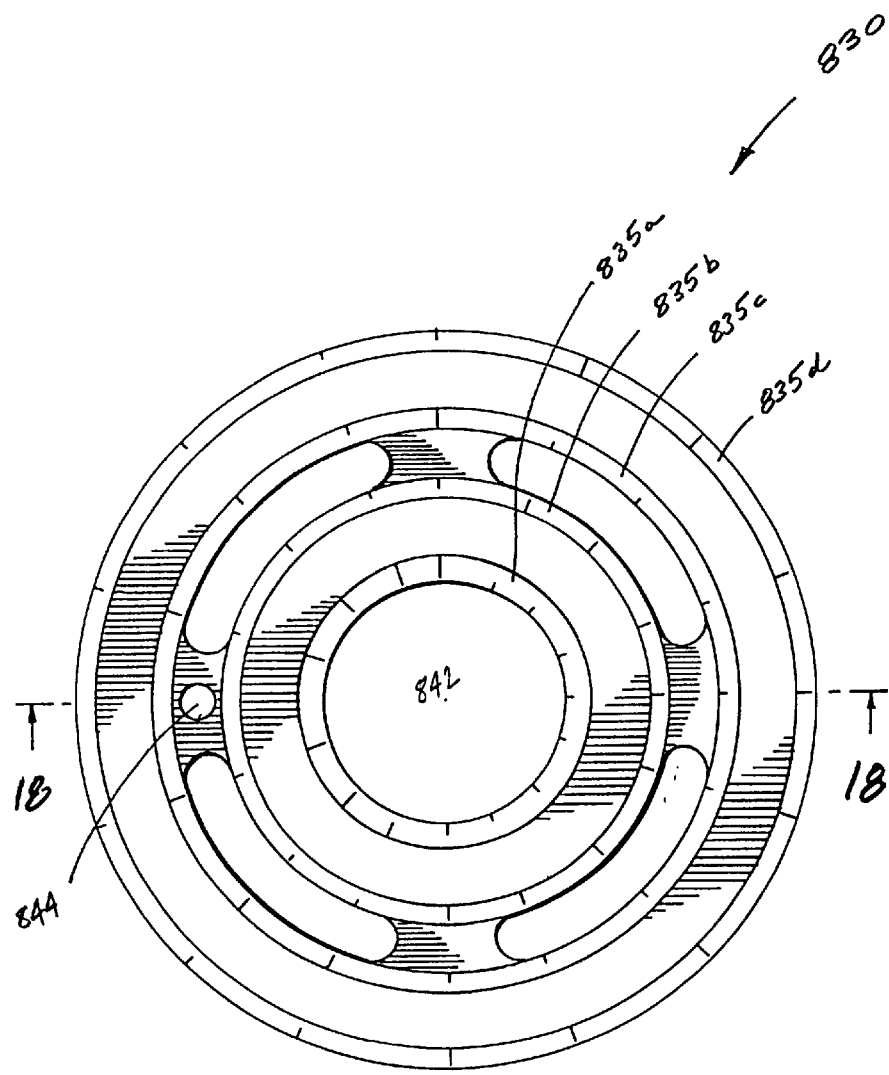
FIG. 17 is a top plan view of a sealing plate in which four arcuate flow ports and four radial webs separate concentric sealing surfaces.
Figure 18:
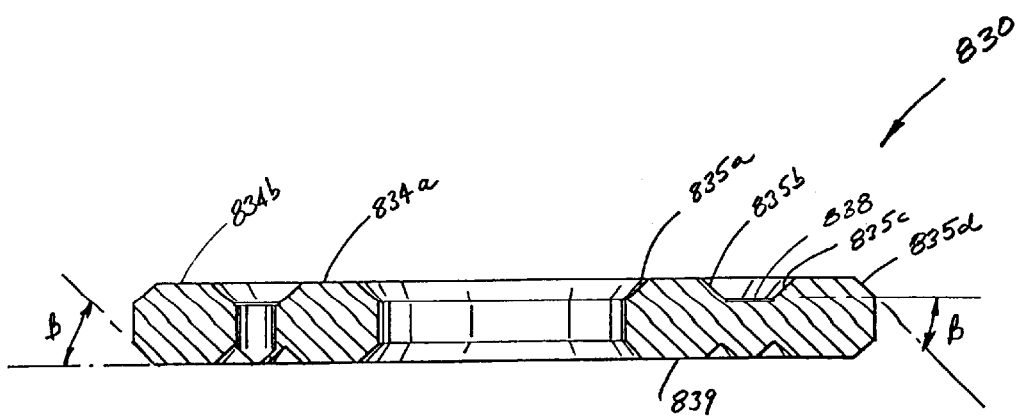
FIG. 18 is a cross-sectional view of the sealing plate shown in FIG. 17, taken along line 18—18, in which the cross-sections of the contoured sealing surfaces are truncated triangles or trapezoids and the lower surface is similarly contoured.

Referring to FIGS. 17 and 18, sealing plate 830 is substantially similar in structure and function to sealing plate 730, except that the lower surface 839 of sealing plate 830 is contoured in a similar manner to sealing surfaces 834a and 834b. The contour of lower surface 839 further facilitates the flow of medium through the valve by assisting in the transition of the flow from flow ports 832a—832d to the valve guard.

Figure 19:
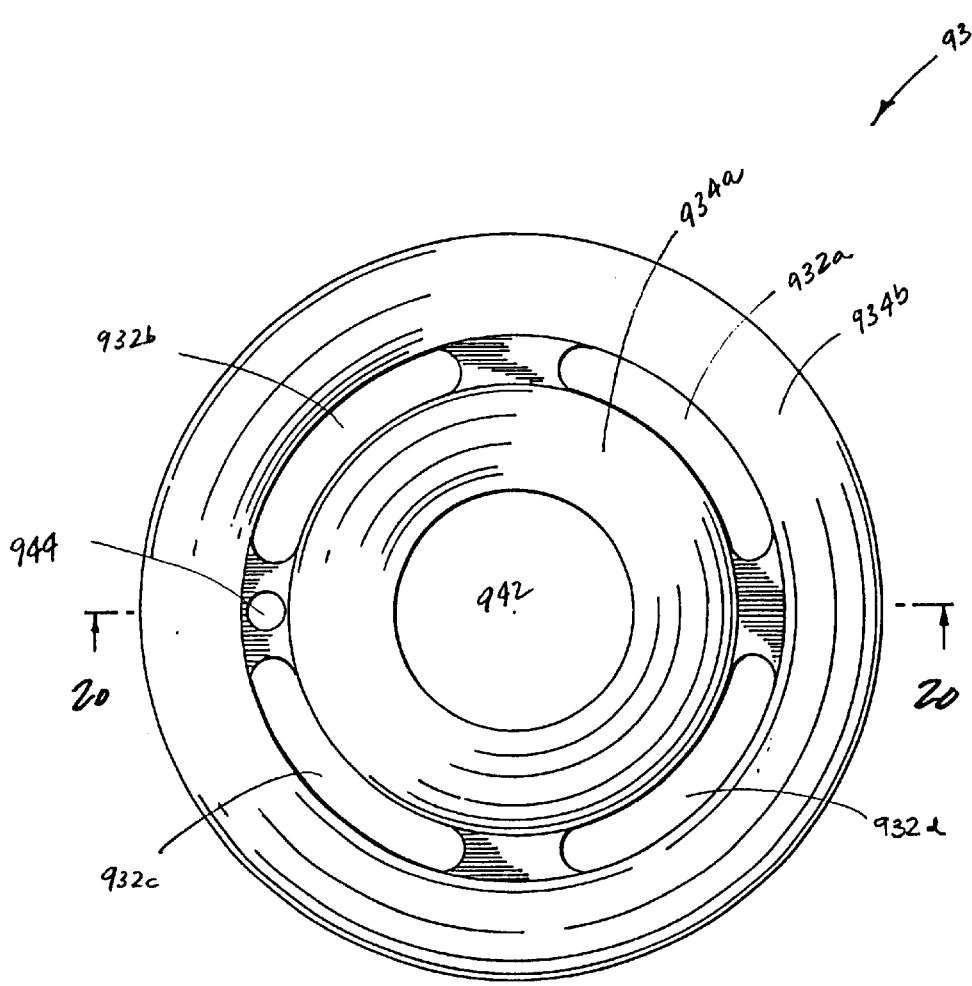
FIG. 19 is a top plan view of a sealing plate in which four arcuate flow ports and four radial webs separate concentric sealing surfaces.
Figure 20:
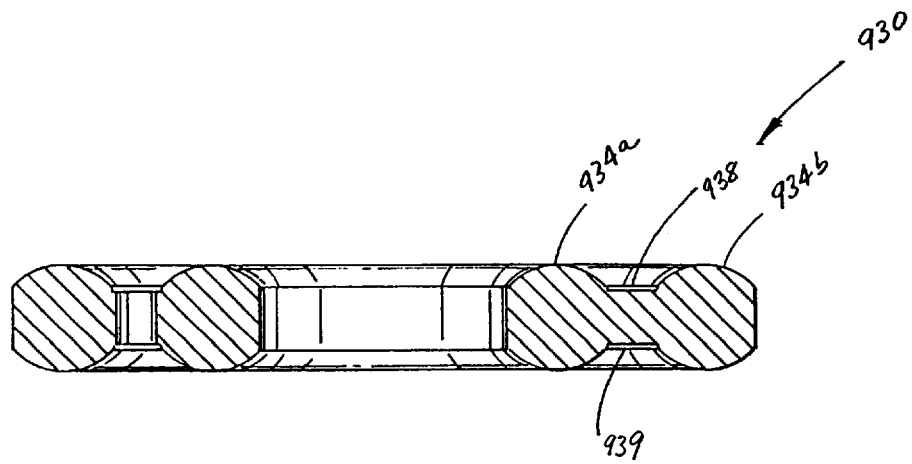
FIG. 20 is a cross-sectional view of the sealing plate shown in FIG. 19, taken along line 20—20. in which the sealing surfaces and the lower surface of the sealing plate are similarly contoured.

Referring now to FIGS. 19 and 20, there is illustrated sealing plate 930 which is substantially similar in structure and function to sealing plate 630, except that lower surface 939 is also contoured in a manner similar to sealing surfaces 934a and 934b. As a result of the curvature of sealing surfaces 934a and 934b, the engagement of sealing plate 930 with a valve seat having a planar seating surface or seating surface that consists of inclined planes, will occur over a continuous line of contact and improve the reliability of the valve closure. It should be appreciated that line of contact occurs along a tangent to the curve which forms the contoured sealing surfaces 934a and 934b. Additionally, as mentioned previously, having a contoured lower surface 939 further facilitates the flow of medium through the valve by assisting in the transition of the flow from flow ports 932a–932d to the valve guard.

While the invention has been described with respect to preferred embodiments, those skilled in the art will readily appreciate that various changes and/or modifications can be made to the invention without departing from the spirit or scope of the invention as defined by the appended claims.

What is claimed is:

1. A compressor valve comprising:
   a) a valve seat having opposed upper and lower surfaces and defining inlet flow ports for admitting a controlled medium, the inlet flow ports extending between the upper and lower surfaces, the lower surface including at least one seating surface;
   b) a valve guard having a recessed area with opposed upper and lower surfaces and defining outlet flow ports for discharging a controlled medium, the outlet flow ports extending between the upper and lower surfaces, the valve guard being secured to the valve seat and spaced therefrom to enclose the recessed area so as to define a cavity therebetween; and
   c) a sealing plate having opposed upper and lower surfaces and defining flow ports extending between the upper and lower surfaces for facilitating flow of a controlled medium through the valve, the sealing plate mounted for movement within the cavity and relative to the lower surface of the valve seat between an open position wherein the sealing plate is spaced from the lower surface of the valve seat so as to permit medium flow through the inlet flow ports of the valve seat and a closed position wherein the sealing plate is engaged with the valve seat so as to prevent medium flow through the valve, the upper surface of the sealing plate includes at least one contoured sealing surface for engaging the at least one seating surface of the valve seat along a continuous line of contact when the valve is in the closed position, wherein a portion of the at least one contoured sealing surface extends beyond the continuous line of contact so as to protrude into the inlet flow ports of the valve seat.

2. A compressor valve as recited in claim 1, further comprising at least one biasing element disposed between the valve guard and the sealing plate, for urging the sealing plate into the closed position.

3. A compressor valve as recited in claim. 2, wherein the at least one biasing element is disposed within a recess in the valve guard.

4. A compressor valve as recited in claim 1, wherein the at least one seating surface of the valve seat includes inclined surfaces oriented relative to the lower surface of the valve seat.

5. A compressor valve as recited in claim 4, wherein the angle of inclination of the valve seat inclined surfaces is about between 90 degrees and 0 degrees relative to the lower surface of the valve seat.

6. A compressor valve as recited in claim 1, wherein the at least one contoured sealing surface of the sealing plate includes inclined surfaces oriented with respect to the upper surface of the sealing plate.

7. A compressor valve as recited in claim 6, wherein the angle of inclination of the inclined surfaces is about between about 55 and about 20 degrees with respect to the upper surface of the sealing plate.

8. A compressor valve as recited in claim 6, wherein the at least one seating surface of the valve seat includes inclined surfaces oriented relative to the lower surface of the valve seat and wherein the angle of inclination of the inclined surfaces of the valve seat and the angle of inclination of the sealing plate inclined surfaces differ from each other.

9. A compressor valve as recited in claim 8, wherein the angle of inclination of the inclined surfaces of the valve seat and the angle of inclination of the sealing plate inclined surfaces differ from each other by about between 10 degrees and 0 degrees.

10. A compressor valve as recited in claim 8, wherein the angle of inclination of the inclined surfaces of the valve seat and the angle of inclination of the sealing plate inclined surfaces differ from each other by about 3 degrees.

11. A compressor valve as recited in claim 1, wherein the at least one contoured sealing surface of the sealing plate includes curved surfaces for achieving continuous line contact with at least one valve seat seating surface.

12. A compressor valve as recited in claim 1, wherein the sealing plate is formed from a metallic material.

13. A compressor valve as recited in claim 1, wherein the sealing plate formed from an elastomeric material.

14. A compressor valve as recited in claim 1, wherein the sealing plate is formed from a composite material.

15. A compressor valve as recited in claim 1, wherein the sealing plate is formed from a thermoplastic material.

16. A compressor valve comprising:
   a) a valve seat having opposed upper and lower surfaces and defining inlet arcuate flow ports for admitting a controlled medium, the inlet flow ports extending between the upper and lower surfaces, the lower surface including first and second seating surfaces;
   b) a valve guard having a recessed area with opposed upper and lower surfaces and defining arcuate outlet flow ports for discharging a controlled medium, the outlet flow ports extending between the upper and lower surfaces, the valve guard being secured to the valve seat and spaced therefrom to enclose the recessed area so as to define a cavity therebetween; and c) a sealing plate having opposed upper and lower surfaces and defining arcuate flow ports extending between the upper and lower surfaces for facilitating flow of a controlled medium through the valve, the sealing plate mounted for movement within the cavity and relative to the lower surface of the valve seat between an open position wherein the sealing plate is spaced from the lower surface of the valve seat so as to permit medium flow through the inlet flow ports of the valve seat and a closed position wherein the sealing plate is engaged with the valve seat so as to prevent medium flow through the valve, the upper surface of the sealing plate including at least first and second contoured sealing rings for engaging the at least first and second seating surfaces of the valve seat along a continuous line of contact when the valve is in the closed position, wherein the seating surfaces of the valve seat do not deform upon engagement with the contoured sealing rings.

17. A compressor valve as recited in claim 16, wherein the at least first and second seating surfaces of the valve seat includes inclined surfaces oriented relative to the lower surface of the valve seat.

18. A compressor valve as recited in claim 17, wherein the angle of inclination of the at least first and second valve seat inclined surfaces are about between 90 degrees and 0 degrees relative to the lower surface of the valve seat.

19. A compressor valve as recited in claim 16, wherein the at least first and second contoured sealing rings are connected by circumferentially spaced apart radially extending web portions.

20. A compressor valve as recited in claim 16, wherein the at least first and second contoured sealing surfaces of the sealing plate includes inclined surfaces oriented with respect to the upper surface of the sealing plate.

21. A compressor valve as recited in claim 20, wherein the angle of inclination of the inclined surfaces is about between about 55 and about 20 degrees with respect to the upper surface of the sealing plate.

22. A compressor valve as recited in claim 20, wherein the angle of inclination of the inclined surfaces of the valve seat and the angle of inclination of the sealing plate differ from each other.

23. A compressor valve as recited in claim 22, wherein the angle of inclination of the inclined surfaces of the valve seat and the angle of inclination of the sealing plate inclined surfaces differ from each other by about between 10 degrees and 0 degrees.

24. A compressor valve as recited in claim 22, wherein the angle of inclination of the inclined surfaces of the valve seat and the angle of inclination of the sealing plate differ from each other by about 3 degrees.

25. A compressor valve as recited in claim 16, wherein the at least first and second contoured sealing surfaces of the sealing plate includes curved surfaces for achieving continuous line contact with the at least first and second valve seat seating surface.

26. A compressor valve as recited in claim 16, wherein the sealing plate is formed from a metallic material.

27. A compressor valve as recited in claim 16, wherein the sealing plate formed from an elastomeric.

28. A compressor valve as recited in claim 16, wherein the sealing plate is formed from a composite material.

29. A compressor valve as recited in claim 16, wherein the sealing plate is formed from a thermoplastic material.

30. A sealing plate for a compressor valve which includes a valve seat defining inlet flow ports and at least one seating surface and a valve guard defining outlet flow ports, the sealing plate comprising:

a body having opposed upper and lower surfaces and defining flow ports extending between the upper and lower surfaces for facilitating flow of a controlled medium through a valve, the upper surface of the sealing plate defining at least one contoured sealing surface which engages with at least one seating surface of a valve seat when the valve is biased in a closed position, preventing the flow of a controlled medium through the valve, the at least one contoured sealing surfaces having a cross-section adapted and configured to achieve continuous line contact with the at least one valve seat seating surface when the valve is in a closed position, wherein a portion of the at least one contoured sealing surface extends beyond the continuous line of contact so as to protrude into the inlet flow ports of the valve seat.

31. A sealing plate for a compressor valve as recited in claim 30, wherein the at least one contoured sealing surface of the sealing plate includes inclined surfaces oriented with respect to the upper surface of the sealing plate.

32. A sealing plate for a compressor valve as recited in claim 31, wherein the angle of inclination of the inclined surfaces is about between about 55 and about 20 degrees with respect to the upper surface of the sealing plate.

33. A sealing plate for a compressor valve as recited in claim 31, wherein the at least one seating surface of the valve seat includes inclined surfaces oriented relative to the lower surface of the valve seat and wherein the angle of inclination of the inclined surfaces of the valve seat and the angle of inclination of the sealing plate inclined surfaces differ from each other.

34. A sealing plate for a compressor valve as recited in claim 33, wherein the angle of inclination of the inclined surfaces of the valve seat and the angle of inclination of the sealing plate inclined surfaces differ from each other by about between 10 degrees and 0 degrees.

35. A sealing plate for a compressor valve as recited in claim 33, wherein the angle of inclination of the inclined surfaces of the valve seat and the angle of inclination of the sealing plate inclined surfaces differ from each other by about 3 degrees.

36. A sealing plate for a compressor valve as recited in claim 30, wherein the at least one contoured sealing surface of the sealing plate includes curved surfaces for achieving continuous line contact with at least one valve seat seating surface.

37. A sealing plate for a compressor valve as recited in claim 30, wherein the sealing plate is formed from a metallic material.

38. A sealing plate for a compressor valve as recited in claim 30, wherein the sealing plate formed from an elastomeric.

39. A sealing plate for a compressor valve as recited in claim 30, wherein the sealing plate is formed from a composite material.

40. A sealing plate for a compressor valve as recited in claim 30, wherein the sealing plate is formed from a thermoplastic material.

* * * * *